United States Patent [19]
Farrell

[11] 4,234,056
[45] Nov. 18, 1980

[54] LUBRICATION FITTING
[75] Inventor: Richard R. Farrell, Verona, Pa.
[73] Assignee: CTS, Inc., Madison Heights, Mich.
[21] Appl. No.: 957,102
[22] Filed: Nov. 2, 1978
[51] Int. Cl.³ .............................................. F16N 23/00
[52] U.S. Cl. .................................. 184/105 B; 137/539
[58] Field of Search ...................... 184/105 B; 137/539
[56] References Cited
U.S. PATENT DOCUMENTS
2,400,817 5/1946 Fox et al. ......................... 184/105 B
3,568,800 3/1971 Fisher ............................... 184/105 B FOREIGN PATENT DOCUMENTS
825120 11/1937 France .................................. 184/105 B

*Primary Examiner*—David H. Brown
*Attorney, Agent, or Firm*—Harness, Dickey & Pierce

[57] ABSTRACT

A lubrication fitting has a stepped ball check spring which is threaded through the spring closure into a hardened housing.

6 Claims, 5 Drawing Figures

LUBRICATION FITTING

BRIEF SUMMARY OF THE INVENTION

It is the purpose of this invention to improve the construction and method of manufacture of lubrication fittings of the type widely used on cars and trucks, off the road vehicles, farm equipment, industrial machines, etc., and which comprises a housing containing a ball check closing a lubricant inlet at one end of the housing and a helical ball check spring seated against an annular closure at the other end of the housing and defining the outlet.

The invention accomplishes this purpose through the use of a special stepped spring. This spring has a large diameter section which seats against the closure and has a few large coils that are engageable with the inside wall of the fitting to provide lateral support and stability for the spring and a low spring rate resilient support for the ball check. The spring has a small diameter section which has a relatively large member of small coils that are smaller in diameter than the outlet opening in the closure, as is the ball check. The ball check and the small diameter spring section can therefore be inserted into the housing through the outlet after the closure is formed in the housing. When so inserted, the small diameter spring section acts during assembly as a guide, pilot, retainer, and torque and compression receiver for the entire spring which enable it to be rotated so that the large diameter section can be threaded past the closure into the housing. By following this procedure the housing can be hardened after the closure is formed in it, and then the ball check and spring assembled inside of the housing to form the fitting. The center of gravity of the spring is in the small diameter spring section thereby giving stability to it during the spring threading operation.

DETAILED DESCRIPTION OF THE INVENTION

Figure 1:
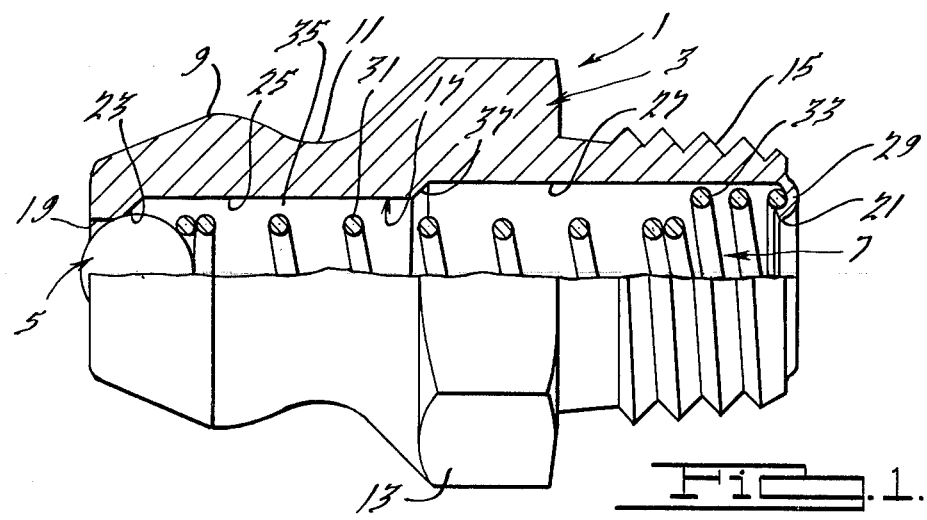
FIG. 1 is a side elevation, partly in section, of a lubricant fitting embodying the invention.

The drawings show a hydraulic lubrication fitting 1 of a basic design used in fittings sold on the open market and widely used in the on and off the road vehicles, farm and industrial machinery and equipment, etc. The fitting consists of a tubular housing 3, a ball check 5, and a helical coil spring 7. The housing 3 has an enlarged head 9 at its grease inlet end and then a reduced diameter portion 11 to give clearance for the locking jaws of a coupler (not shown) used to force grease into the fitting. Adjacent the portion 11 is an enlarged wrenching section 13, shown as hex shaped, whereby the externally threaded section 15 at the outlet end of the fitting may be screwed home in an internally threaded aperture (not shown) at the end of a lubrication passage (not shown).

The housing 3 has an aperture 17 running through it with an inlet portion 19 at the head end and an outlet portion 21 at the threaded end. The aperture 17 is conically enlarged at the inner end of the inlet portion 19 to form an annular seat 23 for the ball check 5. The aperture has a uniform diameter portion 25 extending from the seat 23 to a plane substantially in radial alignment with the wide hex section 13 where it is slightly enlarged at section 37 into a uniform diameter portion 27 that runs to an annular, curved, inwardly extending flange or shoulder 29, usually referred to as the "closure". It has an inner diameter that defines the outlet portion 21.

The ball check is held against seat 23 by a squared coil at the end of spring 7. The spring is formed on a spring coiling machine from a single piece of wire and has a small uniform diameter section 31 and a large uniform diameter section 33, the large section extending to and being seated against the shoulder or closure 29. The spring is compressed at assembly to about ⅝ of its free state length, this being absorbed primarily by the larger, lower rate coils. The smaller diameter section 31 preferably has at least four coils in addition to its end coils and contains the center of gravity of the spring. It is preferably about 50-75% of the free length of the spring and over half the length of housing 3. The coils in each spring section are preferably of substantially uniform diameter and pitch with the outer diameter of the coils in section 31 preferably being about the same as the diameter of the ball 5 and substantially less than that of aperture portion 25 to provide an annular grease flow space 35 communicating with inlet 19 and seat 23 on the outside of spring section 31. There are preferably three coils in the large section 33 of the spring and these are of substantially the same diameter as aperture portion 27 after assembly and enlargement due to compression so that they provide some lateral support for the entire spring.

Figure 2:
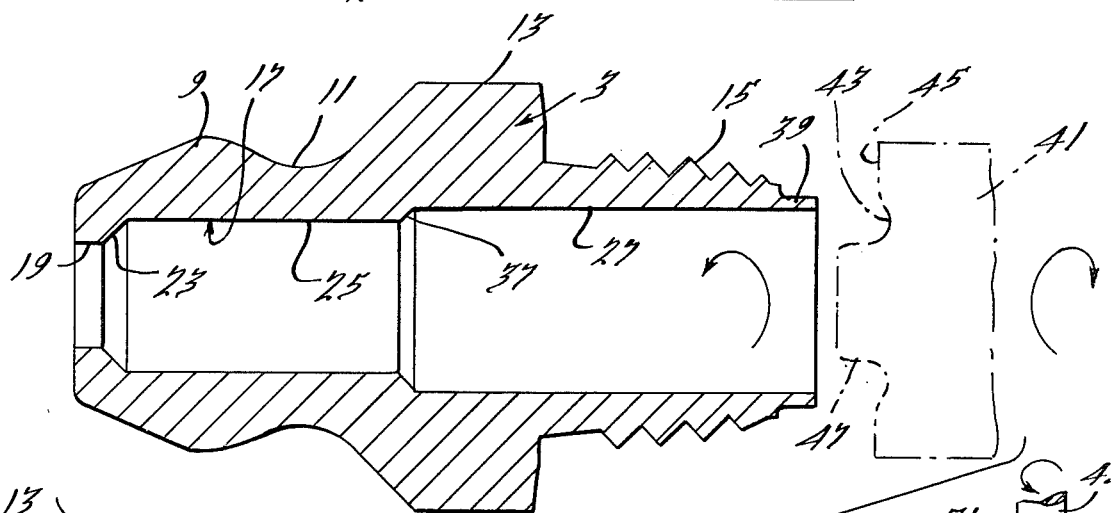
FIG. 2 is a longitudinal cross section of the housing of FIG. 1 shown prior to formation of the closure in the housing, the Figure also showing in phantom lines a spinning tool for forming the closure in the housing.

The closure 29 is an integral part of the body of metal housing 3. As seen in FIG. 2 when the housing is formed it initially has a uniform wall thickness sleeve section 39 at its outlet (right) end. Prior to assembly with ball 5 and spring 7, the sleeve section 39 is shaped by suitable means into the closure 29 (which is preferably curved as shown). Preferably, the shaping means includes a spinning tool 41 having a shaping recess 43 in its end face 45 along with a sizing diameter 47 so that with the housing 3 and tool 41 rotating in opposite directions and axial pressure applied to the tool, as in FIG. 3, the sleeve 39 will be spin-formed into the closure 29 and outlet 21 illustrated.

The outlet 21 is larger than both the ball check 5 and the small diameter section 31 of spring 7. Thus, the ball check can be inserted into the housing through outlet 21 after the closure 29 is formed, as can the small diameter section 31 of the spring. Insertion of the entire helical spring 7 is accomplished by rotating it so that it will be screwed into the aperture 17. This is made practical by the lengthy small diameter section 31 which serves as a guide and pilot that simply slides through outlet 21 so that it is only necessary to push on the spring and rotate it to screw spring section 33 past the closure 29, the large coils of section 33 acting like helical threads upon relative rotation of the spring and housing to ride on the inner edge of closure 29 and advance the spring into housing.

Figure 4:
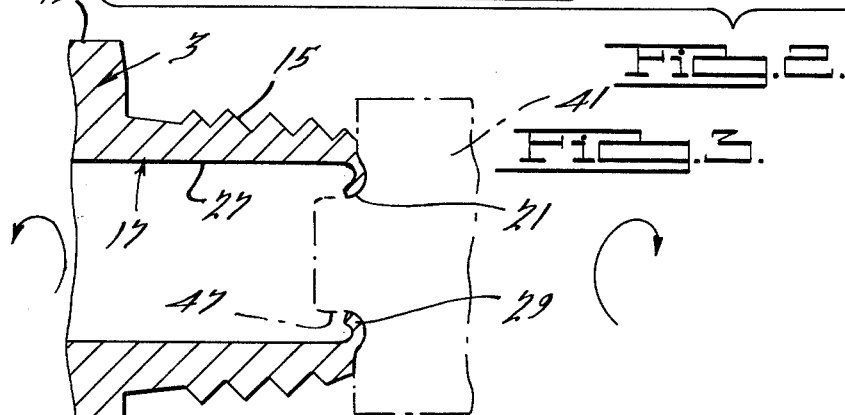
FIG. 4 is a side elevation of the stepped helical spring in the free state prior to insertion in and compression inside of the housing, the Figure showing the preferred uniform coil pitch and also showing in phantom lines a driver tool for pushing and rotating the spring so that the smaller diameter section may be inserted as a pilot into the housing and then rotated and compressed as needed to enable the large diameter section to be threaded and past the closure.
Figure 5:
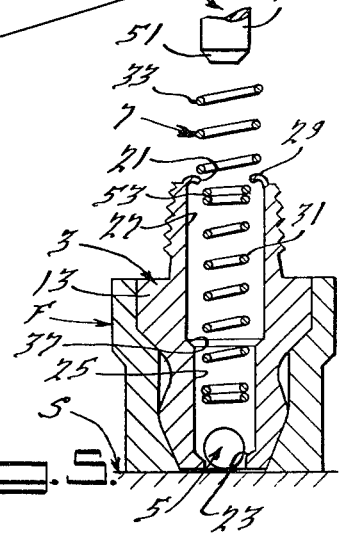
FIG. 5 is a side elevation, broken away, in section, and schematic, illustrating the relationship of the parts just prior to threading in of the spring.

Insertion, axial loading, and rotation of the spring 7 is conveniently accomplished by means of a rotary driver 49 (FIG. 4) that has an outer diameter less than the diameter of outlet 21 and larger than the inner diameter of the small coils. A suitably shaped end surface 51 engages the small coils 53 at the inner end of small diameter section 31 next to large diameter portion 33 of the spring. This enables it to axially push the section 31 into the housing and then apply axial load and torque to section 31 and thereby feed and rotate the entire spring so that the large coils are screwed into the aperture 17 far enough to enable the end large coil to snap into the seat upon the concave, radial inner face of closure 29. Rotation is facilitated if the surface 51 includes one or more tapered portions (like a screw driver) that have frictional contact with the small coil 53 along an angle of tangency less than the angle of repose. Rotation and insertion of the spring 7 is facilitated also by having two end coils axially next to each other at the inner end of the small diameter section 31 as shown at 53. This provides a stiff seat for the end 51 of driver 49 which gives an effective purchase for the application of axial feed load and rotational torque from the driver to the spring.

Figure 3:
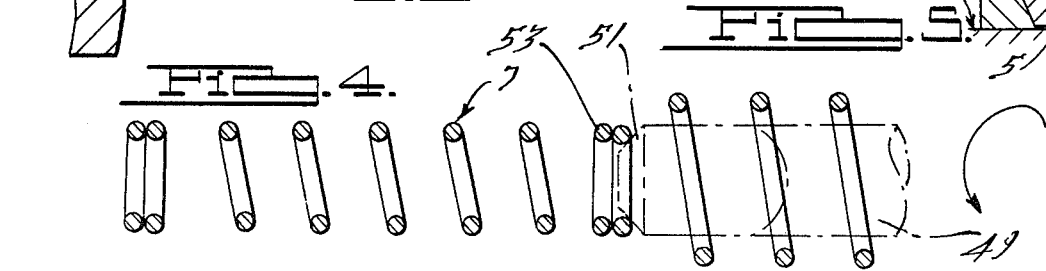
FIG. 3 is a partial longitudinal section of the housing of FIG. 2 but showing it after the closure has been formed, the Figure also showing in phantom lines a spinning tool for forming the closure.

In actual practice, the housing 3 is ordinarily made of low carbon steel and then case hardened so that an outer surface layer thereof is relatively hard and wear resistant. The case hardening process of choice includes gas carburizing to increase the carbon content of the outer layer and its potential hardness. This hardness may be achieved by heat treating a previously carburized part in the usual way (viz., heating above the critical temperature, quenching, and tempering) to harden it. Alternatively, the part may in some cases be quenched and hardened directly at the conclusion of the carburizing treatment without cooling to ambient temperature. Because the spring 7 is inserted after the closure 29 is formed in the housing 3, the entire housing may be hardened after the closure is formed since the full width of aperture portion 27 is not required for insertion of ball check 5 and spring 7. The housing 3 may be carburized in the condition of FIG. 2, the closure 29 formed as in FIG. 3, and then hardened or it may be carburized and hardened after the closure has been formed, i.e., after the operation of FIG. 3 is completed. In either case the closure is fully formed before the housing is hardened. Selective hardening is not required. The same procedure is followed if the housing is made of steel or other metal that has sufficient inherent hardenability so that it may be hardened without case hardening, i.e., the closure is formed while the housing is soft and thereafter the entire housing is hardened by means of the appropriate heat treatment for the material used. When hardening is done after the closure is formed, the benefits in reduced strain, etc., will be apparent in the microstructure of the closure, particularly at the corner where maximum deformation has occurred. With this method of manufacture, the housing can, if desired, be heat treated to a higher hardness, giving more wear resistance, than would be possible if the closure 29 were to be formed after hardening. It is understood, of course, that the complete assembly of housing, ball check, and spring (i.e. the fitting) cannot reasonably be heated to the elevated temperatures required to harden the housing.

The special stepped construction of the spring 7 makes it feasible from a practical manufacturing standpoint to screw it across the closure 29 into the housing 3. Fittings of this type must be made on a mass production basis of hundreds per hour by means of equipment that may be partly or fully automated. With the present fittings, the hardened housings 3 with closures 29 may be supported separately in fixtures and disposed so that their axes are vertical with the inlet ends and ball check seats 23 on the bottom since this will enable the balls to be inserted through opening 21 (which will be on top) and settle by gravity on the seats. Then, the small diameter sections of the springs 7 may be inserted through openings 21 into the apertures 17. Upon insertion (FIG. 4), the axis of the spring 7 is vertical and the large diameter section 33 is outside the housing 3 resting on the outside of closure flange 29; and the small diameter section 31 (and the center of gravity) is inside of the housing 3 to act as a retainer to prevent the spring from falling out and as a guide to hold it substantially vertical and coaxial with the housing to facilitate receipt of the driver 49. The location of shoulder 37 and the length of section 31 are preferably such that when the large coils 33 are still outside the housing resting on closure 29 the end of section 31 is in aperture section 25 so that the wall of the aperture can engage it, if necessary, to help prevent the spring from tilting, or from being knocked out. When the driver is inserted, the small diameter spring section at its junction with the large diameter section provides one or more coils 53 at a substantially predetermined position to receive feed forces from the driver 49 whereby the spring is pushed and rotated to thread it past closure 29 and allow it to seat itself on the concave inside face of the closure to complete the assembly of the separate parts 3, 5 and 7 into the fitting 1. Fixture F, which may be carried on a horizontally movable surface S such as an indexing table, has a socket to receive and support the housing 3 and takes the axial load and the torque applied to it.

Thus, the special stepped diameter spring 7 produces several advantages. The large uniform outer diameter coils working in aperture portion 27 can contact the wall of the aperture to provide lateral support and stability for the spring. The small coil or coils 53 at the junction of the two diameters serve as a predetermined seat for the end of driver 49 to efficiently receive feed load from it during assembly. The special uniform diameter small coil section 31 containing the center of gravity acts as a pilot, guide, and spring retainer during assembly to facilitate the use of mass production assembly techniques and automatic equipment. It reduces the number of large coils that must be threaded through the closure 29 and contains enough coils itself to avoid permanent set when under compression against ball check 5 as the last large coil is fed into its housing by driver 49. By making fast production threading-in-place of the spring 7 practical, the spring 7 also permits fittings to be mass manufactured with closures 29 formed before the housings are hardened, a feature that substantially eliminates rejects due to metal fracture because of bending of a hard sleeve section 39 after the spring has been inserted. In addition, spinning of closure 29, as by tool 41, is possible when sleeve section 39 is soft and is believed to produce a better metal condition and microstructure at the stressed volume than crimping or bending.

Thus, as compared with those now available on the open market, the invention is thought to result in an improved fitting 1 with respect to its function, its construction, and its manufacture. Modifications in specific details disclosed may be made without departing from the spirit and scope of the invention.

I claim:

1. A lubrication fitting comprising a hollow hardened metal housing having a valve seat at one end and an annular flanged closure at the other end and an aperture extending between the seat and closure, said valve seat forming an inlet for lubricant and said closure having an opening in it forming an outlet for lubricant, a ball check valve on said seat, said ball valve being smaller in diameter than said outlet whereby said ball valve may be inserted into the housing through the opening after the closure is formed, a stepped two diameter helical coil valve spring compressed between the ball valve and the closure, said spring having a first diameter section comprising a plurality of uniform diameter coils adjacent the ball valve that are smaller in diameter than the outlet opening and contain the center of gravity of the spring and having a second diameter section comprising a second and smaller plurality of uniform diameter coils adjacent the closure that are larger in diameter than said outlet and adapted to be threaded past the closure during assembly, said coils of said first plurality being of substantially uniform diameter and the coils of said second plurality being of substantially uniform diameter, the coils of said second plurality being substantially in engagement with the wall of the aperture to provide lateral support for the spring, the first plurality of coils having a substantially greater overall length than the second plurality of coils, said housing having a microstructure at said closure produced by formation of said closure prior to hardening of the housing, the first plurality of coils having at least two coils at the junction with the second plurality substantially engaging each other to provide a relatively stiff seat for a driver tool to apply axial force and torque to the spring in order to thread the second plurality of coils past said closure.

2. A fitting as set forth in claim 1 wherein said second plurality comprises at least three coils and said spring is compressed in the housing to about ⅔ of its free length.

3. A spring as set forth in claim 1 wherein said first plurality of coils extends over half the length of the spring and half the length of the housing.

4. A fitting as set forth in claim 1 wherein said aperture is shaped to have a first and smaller diameter portion adjacent said valve seat and a second and larger diameter portion adjacent said closure, the smaller diameter section of said spring being in said first aperture portion and smaller in diameter than said first portion and being substantially longer than the second portion so that the first section of the spring can be a pilot inside the first portion of the aperture even if the second section of the spring is outside the housing.

5. A fitting as set forth in claim 4 wherein the metal of said closure has a spin formed microstructure.

6. A fitting as set forth in claim 5 wherein said closure has an annular concave surface engaging the spring.

* * * * *